United States Patent Office 3,808,239
Patented Apr. 30, 1974

3,808,239
METHOD OF MODIFYING WAX AND NOVEL PRODUCT
John H. Rolker, Altadena, Calif., assignor to
Bell & Howell Co., Chicago, Ill.
No Drawing. Filed Jan. 22, 1973, Ser. No. 325,493
Int. Cl. C07c 53/00
U.S. Cl. 260—398                                    11 Claims

ABSTRACT OF THE DISCLOSURE

A method of modifying selected wax, comprising contacting wax comprising saturated long chain aliphatic monoesters with a catalyst in a contacting zone, the catalyst comprising metal carbonyl of a Group VIII transition element, said contacting being effected for a time sufficient to change the characteristics of the wax. The resulting modified wax is recovered from the contacting zone as a novel product. The carbonyl preferably is selected from the group consisting of iron carbonyl, cobalt carbonyl, nickel carbonyl and mixtures thereof. Most preferably, carnauba wax is used as the starting material and is contacted with iron carbonyl, preferably iron pentacarbonyl. Novel products obtained exhibit improved characteristics such as increased melting points, lubricity and solubility.

FIELD OF THE INVENTION

The present invention generally relates to waxes and more particularly to methods of improving the same and the novel products obtained thereby.

BACKGROUND AND SUMMARY OF THE INVENTION

Current attempts to modify waxes and the like usually involve saturating unsaturated types at their double bonds with hydrogen, halogens and the like under conventional reaction temperatures and the like, and/or substituting halogens at various other reactive sites. However, saturated types of waxes, that is waxes largely comprising esters formed of saturated alcohols and saturated acids are generally considered to be non-reactive and unmodifiable. Such waxes are naturally obtained waxes generally of high carbon chain length, high melting point, high hardness and like characteristics.

A typical example of a natural wax is carnauba wax obtained from the Brazilian wax palm or its root. Carnauba wax comprises mainly myricyl cerotate and as such has an average carbon chain length of about 50. Carnauba wax is characterized by a high melting point of about 83–88° C. and is very hard, amorphous in structure and provides a high gloss upon polishing so that it forms a highly desirable constituent for high grade polishes and the like. However, it has a relatively low lubricity factor and so has little application in uses requiring this feature.

Another useful natural wax is Chinese wax which largely consists of ceryl cerotate, both components of the ester having carbon chain lengths which average 26 carbon atoms. This wax is also hard, durable and useful in various types of polishes, coverings and the like.

A saturated wax of animal origin, spermaceti largely comprises cetyl palmitate. Although such wax is relatively softer and less durable than carnauba and Chinese wax, it is also highly desirable in a number of applications and formulations.

The uses of natural waxes could be greatly expanded if their characteristics could be modified in a controlled manner to provide them with, for example, higher melting points and greater solubility in selected solvents. Unfortunately, conventional methods of treating waxes to modify them have no significant effect on natural waxes. Accordingly, it would be desirable to provide a simple, inexpensive means for modifying such waxes to improve certain of their characteristics.

The preesnt invention is generally as set forth in the abstract above. In this regard, a novel method is provided which satisfies the foregoing needs by producing novel modified waxes having improved characteristics. The method is, in part, characterized by the use of saturated aliphatic esters as the starting wax material which esters are modified by contact with a treating agent having a catalytic effect. This agent comprises the carbonyl of a metal selected from the transition elements of Group VIII of the Periodic Table. The contacting is effected at a selected temperature with the wax starting material in a dispersed form and in an inert environment. The contacting is carried out for a time sufficient to effect the desired changes in characteristics of the wax to produce the new wax product. The melting point of the wax can be thus increased and the inherent lubricity of the hard starting material can be upgraded while retaining the natural high gloss characteristic of the material in a polished state. Moreover, the material may become more readily soluble in selected conventional solvents. Accordingly, improved modified waxes can be provided by a simple, efficient and inexpensive method. Further aspects of the present invention will be apparent from the following detailed description.

DETAILED DESCRIPTION

In accordance with the method of the present invention, selected wax is modified by contacting it with selected catalyst under suitable reaction conditions in a contacting zone.

The wax used in the present method comprises saturated long chain aliphatic mono-esters, generally having carbon chain lengths of at least 30 carbon atoms and usually about 40 carbon atoms or more. The esters of the waxes generally comprise those formed of monocarboxylic acids and monohydric alcohols. Such waxes usually are natural waxes obtained from vegetable and animal sources rather than from mineral sources. Although the waxes utilized in the present method are generally considered to be, and are referred to hereinafter, as saturated, and, in fact, have proven under conventional conditions to be totally non-reactive, they may contain up to about one unsaturated double bond per every three molecules. Conventional processes have been unsuccessful in causing any noticeable reaction at such double bonds to modify the characteristics of these waxes.

Although a number of such natural waxes can be used in the preesnt invention, the most preferred is carnauba wax, a very hard vegetable wax which takes a high gloss upon polishing and is a premium wax for a variety of applications. Carnauba wax is derived from the Brazilian wax palm or its root and is insoluble in water but soluble in ether, boiling alcohol and alkalies. Carnauba wax largely comprises myricyl cerotate, that is the ester of myricyl alcohol, having the general formula $C_{30}H_{61}OH$ and cerotic acid having the general formula $C_{26}H_{53}COOH$. Carnauba wax has a melting point of about 83–88° C.

Other suitable waxes for the purposes of the present method include Chinese wax, largely comprising ceryl cerotate, that is, the ester of ceryl alcohol and cerotic acid. Ceryl alcohol has the general formula $C_{26}H_{53}OH$. Chinese wax is soluble in alcohol, chloroform, benzene and naphtha and has a melting point of about 80–83° C. Another natural wax which can be used in the present method comprises spermaceti which largely comprises cetyl palmitate, that is the ester of cetyl alcohol having the formula $C_{16}H_{33}OH$. This wax is soluble in ether and chloroform, as well as carbon disulfide and hot alcohol and has a melting point of about 42–50° C. due to the presence of small amounts of esters of lauric acid ($C_{13}H_{28}COOH$— as well as myristic acid and stearic acid.

It will be noted that the waxes suitable for use in the present method largely comprise mixtures of high carbon chain length saturated mono-esters, but minor amounts of lower molecular weight saturated mono- and di-esters can be present.

The catalyst which is used in the present method comprises a metal carbonyl of a transition element, that is an element in Group VIII of the Periodic Table. Metal carbonyls selected from the group consisting of iron carbonyl, cobalt carbonyl, nickel carbonyl and mixtures thereof are preferred. The most preferred catalyst for present purposes is iron pentacarbonyl having the formula $Fe(CO)_5$. Iron pentacarbonyl can decompose at room temperature or below, boils at 103° C. and at room temperature is a liquid. It is soluble in most organic solvents and in nickel tetracarbonyl. Other forms of iron carbonyl are iron tetracarbonyl, $[Fe(CO)_4]_3$, and iron nonacarbonyl, $Fe_2(CO)_9$, both of which are obtainable as crystals. However, they are less preferred for various reasons. For example, iron nonacarbonyl is very readily decomposed by heat.

Nickel tetracarbonyl having the formula $Ni(CO)_4$ can be used in the present method. It is soluble in alcohol and in many other organic solvents and has a boiling point of 43° C. It explosively decomposes at about 60° C. if in the pure state.

Cobalt tetracarbonyl having the formula $[Co(CO)_4]_2$ is also suitable for use in the present method. It is soluble in ether, alcohol and carbon disulfide, among other solvents, has a melting point of 43° C. and decomposes above 51° C.

The catalyst in the form of the selected metal carbonyl in the present method causes the wax contacted therewith under reaction conditions to change its characteristics, so that it appears as if the wax becomes further saturated, although it is substantially completely saturated before such contact. The net result is a change in the physical properties of the wax, usually an increase in the melting point of the wax or at least some constituent thereof, along with an increased solubility in organic solvents and increased lubricity. Other changes can also occur, depending on the starting materials, specific catalyst and reaction parameters.

The contacting can be carried out in any suitable contacting zone, for example, a closed reaction vessel in which a controlled atmosphere can be provided. In this regard, the contacting takes place in an inert environment or atmosphere, for example, in the presence of nitrogen, helium, argon or the like. The gas does not enter into the reaction but precludes oxidization during the reaction. The concentration of catalyst per unit weight of wax may vary within wide limits, depending on the specific wax, catalyst, reaction conditions, etc. Normally, the catalyst is present in a concentration of between about 0.1 and about 3 percent by weight of the wax, although concentrations as small as about 0.01 and as much as about 20 percent by weight of the wax can be used successfully without materially affecting the results.

The wax during the contacting step is present in a dispersed form, either as a molten liquid or dissolved or substantially completely dispersed in a solvent or dispersant which is non-reactive under the contacting conditions. Such solvent may be, for example, ether, boiling alcohol, alkanes, etc. Moreover, the catalyst may be present as a liquid or gas or dissolved in a suitable solvent, such as ether, benzene, etc., depending on the reaction temperature and particular catalyst selected. Depending upon the particular catalyst and wax used, elevated or ambient temperatures may be employed.

The reaction can be carried out in the contacting zone at about atmospheric pressure and utilizing suitable conventional contacting procedures, as by bubbling the catalyst in gaseous form through the molten wax or wax solution or dispersion. Conventional contacting aids such as mechanical stirring means may be present, if desired. Alternatively, the catalyst as a liquid or dissolved in a solvent can be stirred into and mixed with the dispersed wax. The reaction can take place rapidly so that substantial changes in physical characteristics of the wax can be obtained by contact times as little as 1 second. Normally, however, contact times of between about 10 minutes and about 24 hours are employed. The reaction can be carried out at any temperature sufficient to melt the wax or maintain the wax in solution, and below the decomposition temperature of the metal carbonyl. Generally one can use a reaction temperature of from about 40° C. below to about 40° C. above the metal carbonyl boiling point.

The contacting is carried out until substantial changes in the characteristics of the wax are effected, after which the contacting is discontinued and the resulting new modified wax product is removed from the contacting zone and recovered ready for use. Depending upon the particular state of the wax and the catalyst, the means for separating the modified wax product from the catalyst will vary.

The following specific examples further illustrate certain features of the present invention. In various of the examples, lubricity, or "slipperiness," refers to such property of the modified wax against a smooth glass surface, compared to the natural wax against such surface. Absolute lubricity cannot be accurately defined since it would depend on a combination of several variables such as hardness, pressure during slippage, dynamic vs. static coefficient of friction, nature of sacrificial surface layers, etc.

EXAMPLE I

Carnauba wax is heated in a closed reaction vessel to about 130° C. to render it molten. The vessel is supplied with one atmosphere of nitrogen gas and contacting between the molten carnauba wax and iron pentacarbonyl catalyst is then effected by bubbling the iron pentacarbonyl at a temperature of about 25° C. as a gas carried by nitrogen up through the molten wax. The iron pentacarbonyl is bubbled through the wax at a rate of about 10 cc./min. of $Fe(CO)_5$ per 100 g. of wax. Contacting between the iron pentacarbonyl and the wax is maintained at about 130° C. for about 2 hours, after which the iron pentacarbonyl is flushed from the reaction vessel through a recovery exhaust line and the carnauba wax is then drained in molten form from the reaction vessel, cooled in a closed zone to below its solidification point and recovered for use.

The modified carnauba wax product thus recovered has a melting point of about 90° C. However, upon isolation of the highest melting point constituents thereof, it is found that those constituents have melting points up to about 280° C. The lubricity of the modified wax product is found to be substantially greater than that of the wax before modification. Moreover, the modified wax product is now readily soluble at room temperature in benzene and other solvents whereas the unmodified wax is virtually insoluble in any solvent at such temperature.

The modified wax product is found to have improved utility for polishing purposes. Thus, benzene can be used as a solvent system for the same. The hardness and melting point of the product when dried as a layer (after application in the solvent) are increased while the lubricity thereof is substantially improved, all without decreasing the extent of polish or sheen which can be imparted to such layer.

EXAMPLE II

The above procedure of Example I is followed, except that Chinese wax is substituted for the carnauba wax, the catalyst, iron pentacarbonyl, is bubbled through at the same rate as Example I, and the wax and catalyst are heated to about 120° C. and held at about that temperature in the reaction vessel during the contacting. A modified Chinese wax is obtained having greater solubility in organic solvents, and components having melting points in excess of 200° C.

EXAMPLE III

The procedure of Example I is followed except that spermaceti wax is substituted for the carnauba wax the contacting temperature is about 120° C., with the bubble rate of iron pentacarbonyl being about 5 cc./min. of $Fe(CO)_5$ per 100 g. of wax. The modified wax product has greater solubility in organic solvents, and components having melting points in excess of 150° C.

EXAMPLE IV

Modification of carnauba wax is carried out in accordance with the method set forth in Example I, except that the wax is initially dispersed in isopropanol and is contacted in a dissolved state in the alcohol at about 65° C. with liquid iron pentacarbonyl as a catalyst. The catalyst is used in a concentration of about 10 percent by weight of the wax and the wax is present in the alcohol in a concentration of about 40 volume percent. Nitrogen is used as an inert atmosphere in the closed reaction vessel and mechanical stirring is used to promote the rate of reaction. Contacting is carried out for about 4 hours, after which the temperature of the system is increased sufficiently to drive off the alcohol as a gas, the iron pentacarbonyl being removed as a liquid, leaving the modified carnauba wax product as a solid. The wax product is then heated to above its melting point and drained from the reaction zone and recovered to yield a carnauba wax having superior properties.

In parallel runs, Chinese wax, spermaceti and beeswax can be substituted for the carnauba wax to yield modified wax product exhibiting improved characteristics.

EXAMPLE V

Iron pentacarbonyl is first dissolved in liquid nickel tetracarbonyl at a temperature of approximately 30° C., the concentration of iron pentacarbonyl in the nickel tetracarbonyl being about 10 weight percent. This catalytic liquid is then slowly passed into contact by means of a tube under the surface of the carnauba wax-containing isopropanol solution in the previously described reaction vessel under a nitrogen blanket at about 65° C. The catalyst mixture as determined by total addition is present in a concentration of about 5 percent by weight of the wax and the wax is in a concentration of about 40 percent by volume of the alcohol. Stirring of the resulting liquid is carried out while the reaction zone is maintained at about 65° C. until the reaction is completed in about 16 hours, after which the temperature in the zone is increased to about 80° C. to strip off the alcohol. Any remaining liquid carbonyls are then drained from the resulting modified wax product and the latter is separately recovered to yield a wax with improved solubility and lubricity characteristics.

Parallel runs substituting Chinese wax and spermaceti for the carnauba wax can be made to provide waxes with improved characteristics. Moreover, benzene and ether can be substituted as solvents in place of isopropanol.

In place of the iron carbonyl in Example I, one can use equivalent amounts of cobalt tetracarbonyl or nickel tetracarbonyl.

A method has been disclosed for materially altering the characteristics of saturated waxes containing long chain mono-esters. The novel products of the method represent new waxes having the improved properties previously described. Such waxes are useful as protective coverings and films, gloss-imparting agents in formulations, polishes, lubricants and for other purposes as a substitute for unmodified waxes. The present method is simple, inexpensive and rapid and can be carried out with a minimum of equipment and steps. The catalyst employed is recoverable by conventional procedures and is reusable. A variety of waxes meeting the requirements set forth herein can be modified by the present method. Various changes, alterations and additions can be made in the present method, its steps and parameters and in the new wax products of the method. All such changes, alterations and additions as are within the scope of the appended claims form part of the present invention.

I claim:

1. A novel method of modifying wax comprising saturated long chain aliphatic mono-esters, which method comprises contacting said wax with a catalyst in a contacting zone, said catalyst comprising metal carbonyl of a Group VIIII transition element, for a time in the range of 1 second to 24 hours whereby to increase the lubricity of said wax, and recovering the resulting modified wax from said contacting zone.

2. The method of claim 1 wherein said wax comprises saturated mono-esters having an average carbon chain length of at least about 30 carbon atoms.

3. The method of claim 1 wherein said contacting is carried out in an inert atmosphere.

4. The method of claim 1 wherein said carbonyl is selected from the group consisting of iron carbonyl, cobalt carbonyl, nickel carbonyl and mixtures thereof.

5. The method of claim 3 wherein said wax is natural wax consisting essentially af aliphatic mono-esters having average carbon chain lengths of at least about 40 carbon atoms.

6. The method of claim 5 wherein said carbonyl is selected from the group consisting of iron carbonyl, cobalt carbonyl, nickel carbonyl and mixtures thereof.

7. The method of claim 1 wherein said wax comprises carnauba wax and wherein said carbonyl comprises iron carbonyl.

8. The method of claim 7 wherein said iron carbonyl comprises iron pentacarbonyl, wherein said contacting is carried out in an inert atmosphere and wherein said wax is in a dispersed state at elevated temperature during said contacting.

9. The method of claim 6 wherein said wax comprises carnauba wax and wherein said carbonyl comprises iron carbonyl.

10. The method of claim 9 wherein said iron carbonyl comprises iron pentacarbonyl, wherein said atmosphere comprises nitrogen and wherein said wax is in a dispersed state during said contacting.

11. A novel modified wax product comprising saturated long chain aliphatic mono-esters having increased lubricity by contact with a comprising metal carbonyl of a Group VIII transition element.

References Cited

UNITED STATES PATENTS 3,060,046    10/1962    Kaupp et al. _____ 260—398

ELBERT L. ROBERTS, Primary Examiner

U.S. Cl. X.R.

260—409

PO-1050
(5/69)

UNITED STATES PATENT OFFICE
CERTIFICATE OF CORRECTION

Patent No. 3,808,239      Dated April 30, 1974

Inventor(s) John H. Rolker

It is certified that error appears in the above-identified patent and that said Letters Patent are hereby corrected as shown below:

Column 3, line 3, change "-" to --)--.

Column 5, line 7, after "carnauba wax" add --,--.

Column 6, line 21, change "VIIII" to --VIII--.

line 57, after "a" add --catalyst--.

Signed and sealed this 10th day of September 1974

(SEAL)
Attest:

McCOY M. GIBSON, JR.
Attesting Officer

C. MARSHALL DANN
Commissioner of Patents